(12) United States Patent
Yoshihisa et al.

(10) Patent No.: US 7,443,132 B2
(45) Date of Patent: Oct. 28, 2008

(54) MOTOR CONTROL DEVICE AND METHOD

(75) Inventors: Yasuhiko Yoshihisa, Matsumoto (JP); Hitoshi Igarashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 11/492,919

(22) Filed: Jul. 26, 2006

(65) Prior Publication Data

US 2007/0024221 A1    Feb. 1, 2007

(30) Foreign Application Priority Data

Jul. 28, 2005    (JP)    ............................. 2005-218541
Jul. 28, 2005    (JP)    ............................. 2005-218559

(51) Int. Cl.
*H02P 5/00*    (2006.01)
*G05B 19/40*    (2006.01)

(52) U.S. Cl. ....................... 318/807; 318/607; 388/812; 358/497

(58) Field of Classification Search ................. 318/600, 318/607, 608, 685, 696, 806, 807; 388/812–814; 358/497
See application file for complete search history.

(56) References Cited

U.S. PATENT DOCUMENTS

| | | | | |
|---|---|---|---|---|
| 5,161,029 | A | * 11/1992 | Yamanishi | ................... 358/296 |
| 5,854,877 | A | * 12/1998 | Lewis | ......................... 388/812 |
| 5,900,706 | A | 5/1999 | Hisa | |
| 6,621,242 | B2 | * 9/2003 | Huang et al. | ................. 318/608 |
| 6,997,408 | B2 | * 2/2006 | Watano et al. | ................. 241/30 |
| 7,240,985 | B2 | * 7/2007 | Rogers, IV | ................... 347/37 |

FOREIGN PATENT DOCUMENTS

| JP | 02303390 A | * 12/1990 |
|---|---|---|
| JP | 08266086 A | * 10/1996 |
| JP | 10-215592 A | 8/1998 |
| JP | 2005237198 A | * 9/2005 |

* cited by examiner

*Primary Examiner*—Lincoln Donovan
*Assistant Examiner*—Eduardo Colon Santana
(74) *Attorney, Agent, or Firm*—Sughrue Mion, PLLC

(57) ABSTRACT

A motor control device for controlling rotation of a motor by controlling a driving voltage applied to the motor is provided. The device includes a driving voltage control unit configured to control the driving voltage, and a detecting unit configured to detect rotation of the motor. The motor has operating characteristics indicative of relationship between the driving voltage and a rotation speed of the motor, where the operating characteristics have a specific dead-band range of driving voltages wherein the rotation speed of the motor is zero regardless of changes in the driving voltage. The driving voltage control unit performs a low rotation control operation including at least one alternating repetition of a first control operation and a second control operation. The first control operation adjusts the driving voltage to have a value outside of the dead-band range from a value within the dead-band range, while the second control operation adjusts the driving voltage to have the value within the dead-band range from the value outside of the dead-band range. The second control operation is performed after a specific first amount of motor rotation has been detected in the first control operation.

18 Claims, 8 Drawing Sheets

MOTOR CONTROL DEVICE AND METHOD

CROSS-REFERENCE TO RELATED APPLICATIONS

The present application claims the priority based on Japanese Patent Application Nos. 2005-218541 and 2005-218559, both filed on Jul. 28, 2005, the disclosures of which are hereby incorporated by reference in its entirety.

BACKGROUND OF THE INVENTION

1. Field of the Invention

The present invention relates to technologies for rotating, at an extremely low-speed of rotation, a motor that has a dead band.

2. Description of the Related Art

Conventionally a variety of motors, such as direct-current (DC) motors and alternating current (AC) motors have been used in computers and devices such as scanners and printers. Printers that use motors for feeding paper and for driving a carriage that carries a print head can be presented as an example. (See JP2001-219613A).

In the aforementioned devices, there is the need to rotate the motor at an extremely low speed. This is because in scanners, for example, rotating the motor for transporting the carriage at an extremely low-speed will increase the resolution with which an original is read while moving an image sensor, mounted on the carriage, at an extremely low speed.

Here the control of the speed of rotation of the motor is performed by adjusting the driving voltage that is applied to the motor. For example, for a DC motor, an extremely slow driving voltage would be applied to the motor in order to rotate the motor at an extremely low speed.

On the other hand, a motor often has a voltage range wherein the motor will not rotate (known as a "dead band") because the torque produced in response to the driving voltage is less than the static frictional force. Consequently, if the motor is a DC motor and an extremely small driving voltage is applied to the DC motor in order to increase the scanning resolution, there is a possibility that the driving voltage will be in the range of the dead band, so that the DC motor will not turn.

This problem occurs not only when the motor for moving the carriage is a DC motor, but also in a variety of other motors, such as AC motors, that have dead bands. Moreover, this problem is not limited only to scanners, but also to motors that are used in other devices, where this problem may occur in any motor having a dead band if an attempt is made to rotate the motor at an extremely low-speed of rotation.

SUMMARY OF THE INVENTION

An object of the present invention is to make it possible to rotate, at an extremely low-speed of rotation, a motor that has a dead band.

According to an aspect of the present invention, there is provided a motor control device for controlling rotation of a motor by controlling a driving voltage applied to the motor is provided. The device includes a driving voltage control unit configured to control the driving voltage, and a detecting unit configured to detect rotation of the motor. The motor has operating characteristics indicative of relationship between the driving voltage and a rotation speed of the motor, where the operating characteristics have a specific dead-band range of driving voltages wherein the rotation speed of the motor is zero regardless of changes in the driving voltage. The driving voltage control unit performs a low rotation control operation including at least one alternating repetition of a first control operation and a second control operation. The first control operation adjusts the driving voltage to have a value outside of the dead-band range from a value within the dead-band range, while the second control operation adjusts the driving voltage to have the value within the dead-band range from the value outside of the dead-band range. The second control operation is performed after a specific first amount of motor rotation has been detected in the first control operation.

In this device, the first and second control operations are alternated repetitively at least once, making it possible to repetitively rotate and stop a motor in the vicinity of the dead band. This makes it possible to rotate the motor at an average speed of rotation that is slower than the slowest available speed of rotation if the motor were to be rotated continuously by maintaining the driving voltage outside the dead band range.

Note that the present invention can be realized not just as a motor control device, as described above, but as a device for reading an original, provided with a motor control device. For example, in a device for reading an original of a flat-bed type (wherein the original is stationary), controlling the motor makes it possible to move the image sensor at an average speed that is slower than the slowest available speed of motion of the image sensor when the motor is rotated continuously by adjusting the driving voltage to be outside of the dead zone range. Here, when reading in a original at a high resolution, it is necessary to move the image sensor at a slower speed. Consequently, if the above structure is used it will be possible to read in the original at a higher resolution than the resolution wherein the motor is rotated continuously by maintaining the driving voltage outside of the dead zone range.

DESCRIPTION OF THE PREFERRED EMBODIMENT

Preferred embodiments of the present invention will be explained below in the following order.

A. First Embodiment
  A1. Overall Structure of a Scanner
  A2. Rotation Control Process
  A3. Effects of the First Embodiment B. Second Embodiment
  B1. Rotation Control Process
  B2. Effects of the Second Embodiment C. Modified examples

A. First Embodiment

A1. Overall Structure of a Scanner

Figure 1:
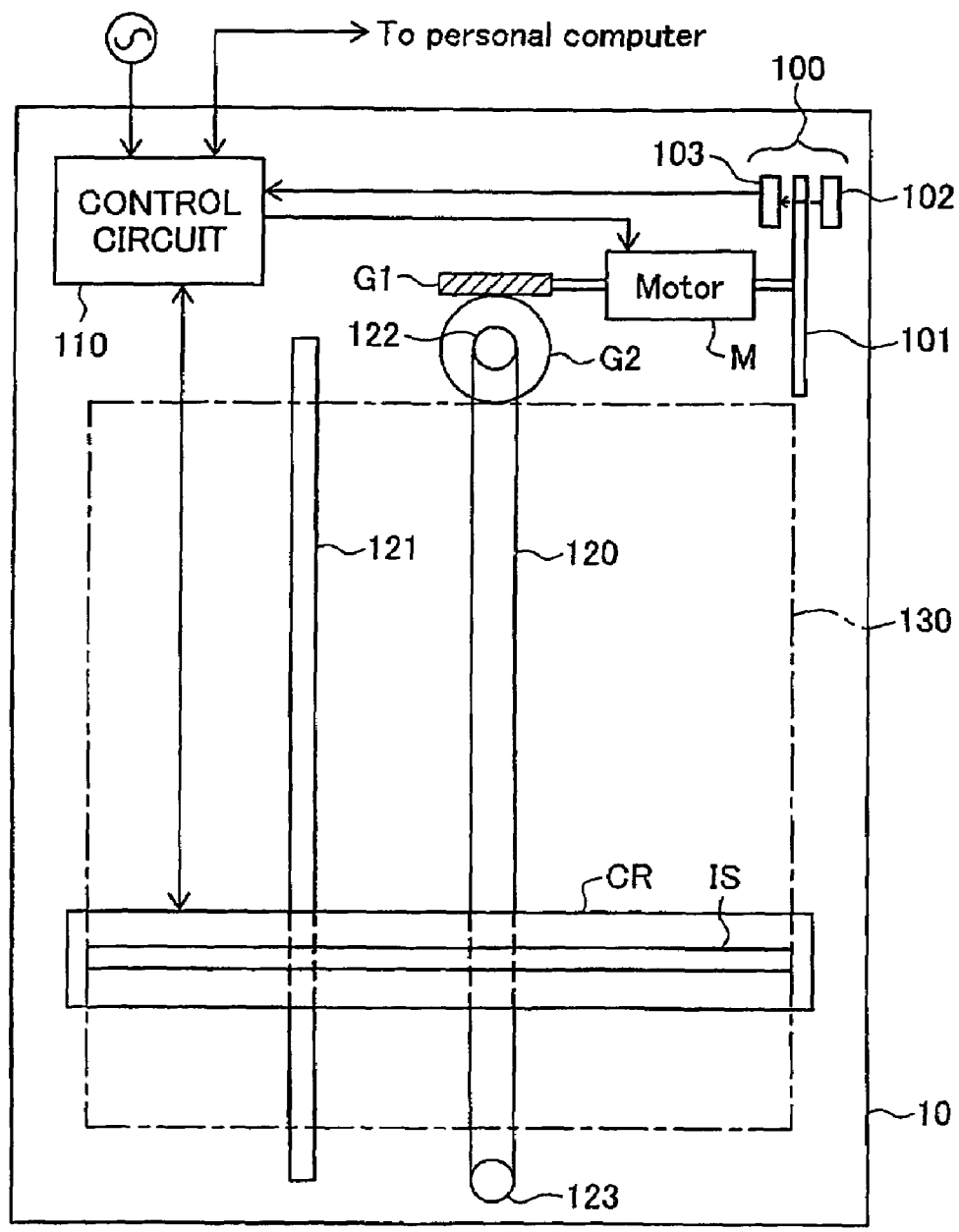
FIG. 1 is an explanatory diagram illustrating the overall structure of a scanner as a first embodiment according to the present invention.
Figure 1:
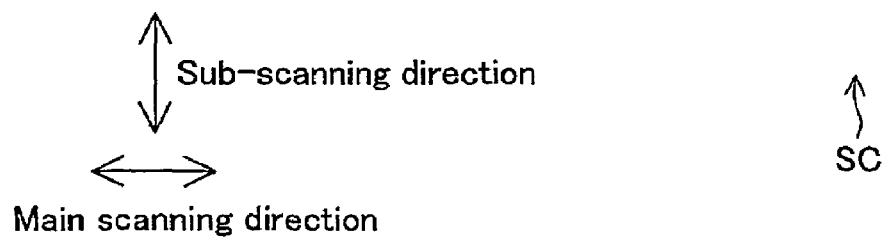

FIG. 1 is an explanatory diagram illustrating the overall structure of a scanner as one embodiment according to the present invention. In FIG. 1, the scanner SC is a scanner of a so-called "flat bed type" (wherein the original remains stationary) that reads in an original while moving the image sensor in the sub-scanning direction. The scanner SC is provided with a contact glass 13, for the placement of the original, on top of a scanner housing (device frame) 10.

The scanner SC is also provided with a carriage CR on which is mounted an image sensor IS for reading in the original, a carriage conveyance mechanism for conveying the carriage CR in the sub-scanning direction, an encoder 100, and a control circuit 110 within the scanner housing 10.

The image sensor IS is an image sensor of the contact image sensor (CIS) type, and is provided with a charged-coupled device (CCD) (not shown) that has photosensitive elements arrayed in the main scanning direction with a specific pixel density, a lens (not shown) for each of the photosensitive elements, and an exposure lamp (not shown) that illuminates the surface of the original with red, green, and blue light. Note that each of the photosensitive elements receives light that is reflected from the surface of the original and accumulates charge, which is outputted as a signal.

The carriage conveyance mechanism comprises a motor M, which is a DC motor, a worm gear G1 that is bonded to the power axel of the motor M, a flat gear G2 that meshes with the worm gear G1 and rotates with a specific reduction ratio, a pulley 122 that is attached to the flat gear G2, a pulley 123 that is attached to the scanner housing 10, a looped timing belt 120 that stretches between the pulley 122 and the pulley 123, and a guide rail 121 that causes the carriage CR to move straightly along the sub-scanning direction. Note that the carriage CR is connected to a portion of the timing belt 120.

The carriage conveyance mechanism conveys the carriage CR in the sub-scanning direction as described below. The rotation of the motor M at a specific rotational speed rotates the worm gear G1 at this specific rotational speed to rotate the flat gear G2 at a specific reduction ratio accordingly, where the pulleys 122 and 123 rotate along with the flat gear G2 to move the timing belt 120 at a specific speed in the sub-scanning direction. The result is that the carriage CR is conveyed in the sub-scanning direction at a specific speed.

Note that the relationship between the amount of rotation of the motor M and the distance of conveyance of the carriage CR will be determined by measurements made in advance. The amount of rotation of the motor M is detected using an encoder 100.

The encoder 100 is a rotary encoder, provided with a disk 101, which is attached to the power axel of the motor M, and a light-emitting diode 102 and photodiode 103 that are positioned on either side of this disk 101.

The disk 101 is provided with slits that are cut at specific intervals along the periphery, so that the photodiode 103 receives light emitted from the light-emitting diode 102 through these slits. The disk 101 rotates along with the motor M, and the photodiode 103 receives light at the slit part but does not receive light at parts other than the slit part, with the result that the photodiode 103 outputs a pulse (hereinafter known as the "encoder pulse") that is high (+3.3V) at the slit part and low (0V) at other than the slit part.

Consequently, it is possible to detect the amount of rotation of the motor M by counting the number of encoder pulses.

Note that, although not shown, there are two pairs of the aforementioned light-emitting diode 102 and photodiode 103, positioned so that two encoder pulses, phase A pulse and phase B pulse, are outputted from the respective photodiode 103 with a phase difference there between of $\pi/2$. This is to improve the accuracy with which the amount of rotation is measured, along with the detecting the direction of rotation of the motor M.

Figure 2:
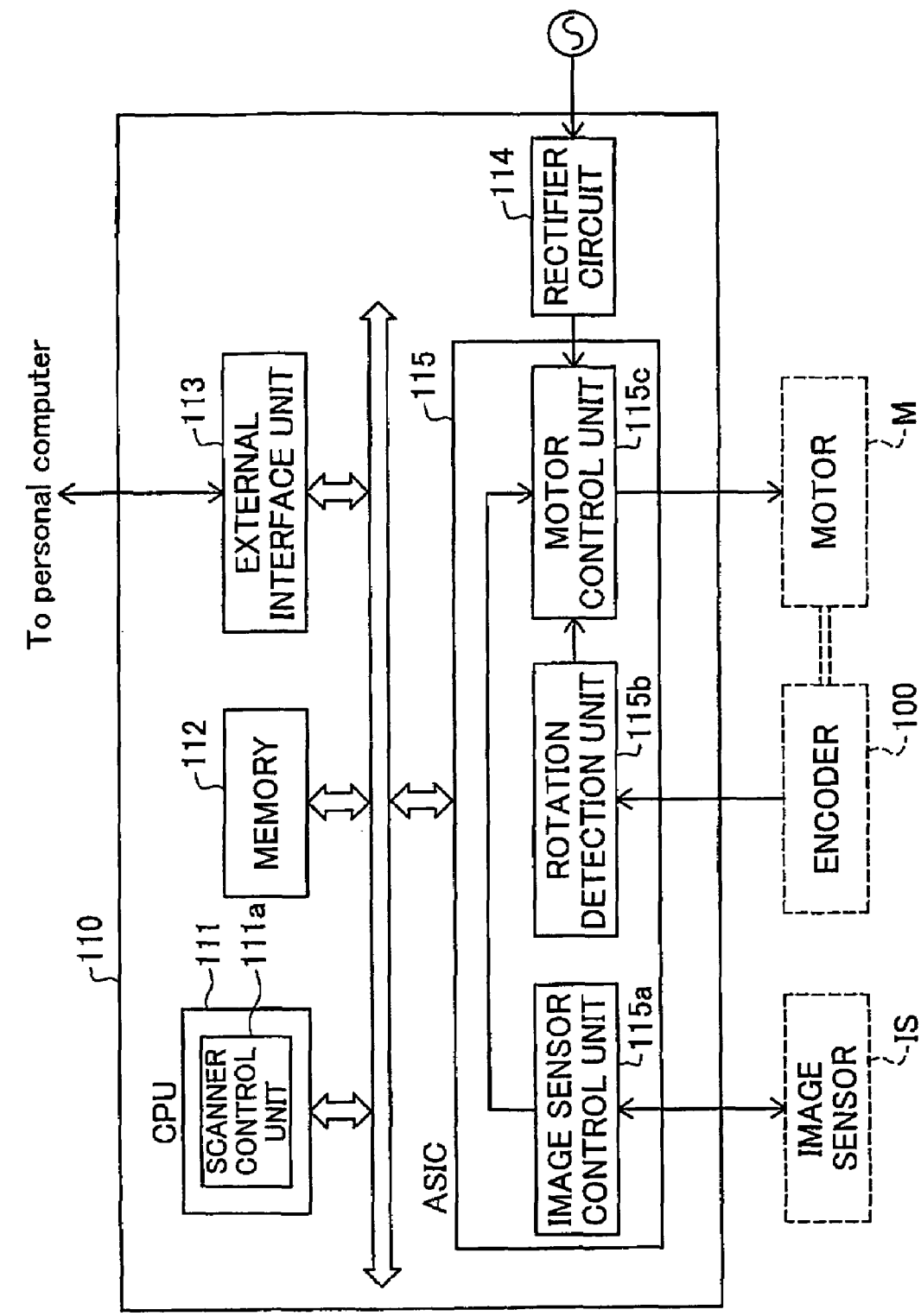
FIG. 2 is an explanatory diagram illustrating the detail structure of the control circuit shown in FIG. 1.

FIG. 2 is an explanatory diagram illustrating a detailed structure for the control circuit 110 shown in FIG. 1. As is shown in FIG. 2, the control circuit 110 is provided with a CPU 111, a memory 112, an external interface unit 113 having a universal serial bus (USB) interface for connecting to a personal computer (not shown), a rectifying circuit 114 for converting the supplied AC power into DC power, and an application-specific integrated circuit (ASIC).

Of these, the memory 112 stores a program for controlling the entirety of the scanner SC, and the CPU 111 executes this program to function as a scanner control unit 111a.

ASIC 115 is provided with an image sensor control unit 115a, a rotation detection unit 115b, and a motor control unit 115c.

The image sensor control unit 115a is the functional unit that, for example, outputs a signal (hereinafter termed the "image sensor driving pulse") that makes the image sensor IS to read the original, and receives, from the image sensor IS, the readout result signal and converts this signal into gradation values or image data.

The rotation detection unit 115b is the functional unit that receives the encoder pulses that are outputted from the encoder 100 and detects the amount of rotation and the direction of rotation of the motor M. Note that this rotation detection unit 115b and the encoder 100 correspond to the "detecting unit" in the claimed invention.

The motor control unit 115c is the functional unit that not only provides the motor M with the DC power that is outputted from the rectifying circuit 114, but also controls the speed of rotation of the motor M through controlling the driving voltage applied to the motor M. Note that the motor control unit 115c receives the encoder pulses and image sensor drive pulses from the rotation detection unit 115b and the image sensor control unit 115a, respectively.

This motor control unit 115c is provided with a register not shown. A duty ratio increase rate, an ending pulse number, and a dead-band duty ratio value are stored in advance in this register according to the resolution in the sub-scanning direction. These values will be explained below.

The motor control unit 115c is also provided with a power control transistor, not shown, to control the driving voltage by so-called "pulse width modulation" (PWM) by changing the ratio of ON time relative to the switching cycle period of this transistor (that is, the "duty ratio"). In other words, when the duty ratio is reduced, the ON time is reduced, and the driving voltage is reduced, but when the duty ratio is increased, the ON time is extended, and the driving voltage is increased. Note that this motor control unit 115c corresponds to the driving voltage control unit in the claimed invention.

Here the relationship between the diving voltage and the speed of rotation is calculated based on measurement performed in advance regarding the characteristics of the motor M mounted in the scanner. These characteristics will be explained using FIG. 3.

Figure 3:
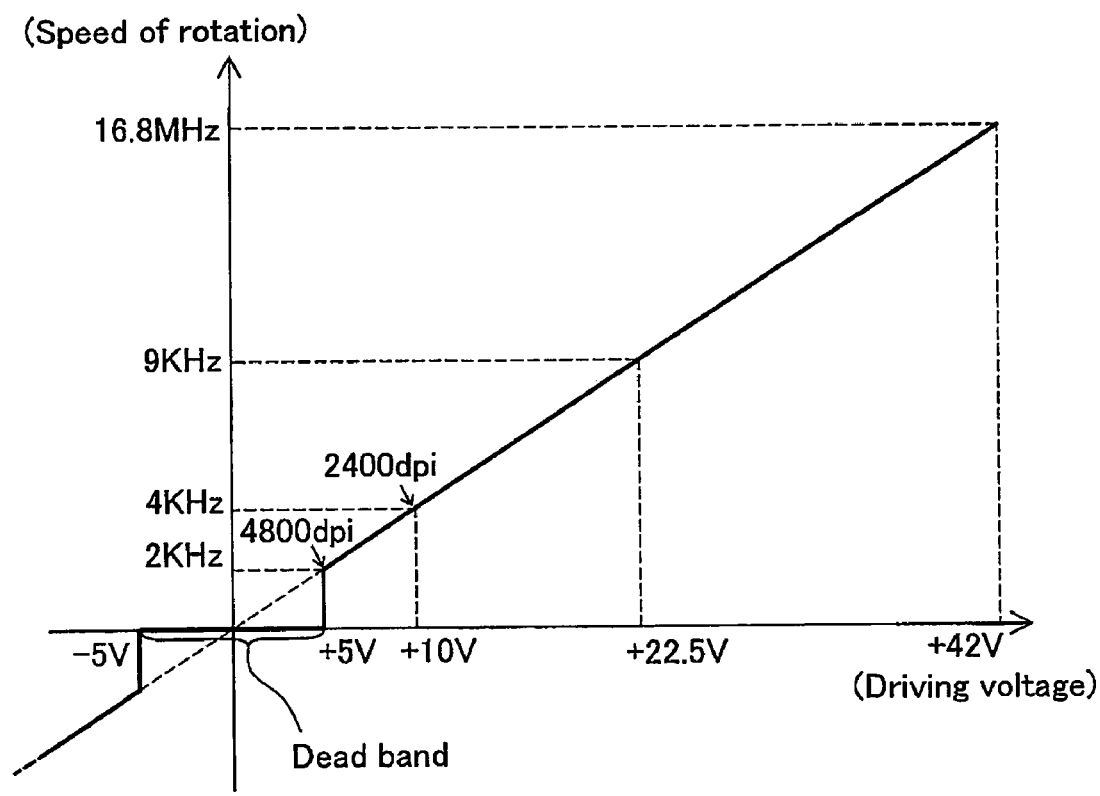
FIG. 3 is a graph illustrating the relationship between the driving voltage and the speed of rotation of a motor.

FIG. 3 is a graph illustrating the relationship between the driving voltage and the speed of rotation in the motor M mounted in the scanner. In the graph shown in FIG. 3, the horizontal axis shows the driving voltage and the vertical axis shows the speed of rotation. Note that for convenience in explanation the portion of the range wherein the driving voltage is less than −5V is omitted.

The number of encoder pulses outputted from the encoder 100 is proportional to the amount of rotation of the motor M, and thus the number of encoder pulses outputted from the encoder 100 in one second (the encoder pulse frequency) is proportional to the amount of rotation of the motor M per second. Given this, in the present embodiment, instead of the revolutions per minute (RPM) that is typically used as the unit for the speed of rotation of a motor M, the encoder pulse frequency (Hz) will be used.

Note that when the driving voltage has a positive value, the motor M rotates in the forward direction, and when the driving voltage has a negative value, the motor M rotates in the backwards direction; however, in the below, the explanation will assume that the motor M rotates in the forward direction, and that the driving voltage has a positive value.

As shown in FIG. 3, in the range wherein the driving voltage is greater than +5V, the speed of rotation of the motor M increases as the driving voltage increases.

However, in a range wherein the driving voltage is less than +5V, the speed of rotation is 0 even when the driving voltage is increased, and the motor M does not rotate. This is because for driving voltages in the range of −5V through +5V (the dead band), the motor M does not produce enough torque to overcome the static frictional force.

Here let us consider the relationship between the scanning resolution with which the original is read in, in the sub-scanning direction in the scanner SC, to the speed of rotation of the motor M.

The scanner SC moves the image sensor IS at a speed suitable to the scanning resolution specified by the user, in order to read in the original while the image sensor IS is being moved in the sub-scanning direction. For example, if there has been an instruction to read in the original at a scanning resolution of 4800 dpi then the image sensor IS will be moved over one inch in a period of time that is equal to 4800× "a specific charge accumulating interval."

The "specific charge accumulating interval" denotes a time period over which the charge is accumulated through each of the photosensitive elements that have CCDs being exposed to light. This is the interval over which the charge is accumulated, and is an interval that is set in advance as the ideal interval for outputting the signal for the individual pixels. Since variation of the specific charge accumulating interval would cause undesired variability in the colors in the image, the scanner SC is constructed such that the charge is always accumulated over the specific charge accumulation interval.

When the scanning resolution is increased, this increases the number of lines that are read in per inch. Consequently, with the same charge accumulating interval for each of the photosensitive elements, the increase of the scanning resolution reduces the speed at which the image sensor IS is moved.

For example, when the specified scanning resolution is 9600 dpi, then the image sensor IS will be moved over one inch in a period of time that is equal to 9600× "a specific charge accumulating interval", and thus the speed of movement of the image sensor IS will be ½ that speed for the case of 4800 dpi.

In order to move the image sensor IS at a slower speed, the carriage CR will be conveyed more slowly, and thus the motor M will be rotated at a slower speed of rotation.

Consequently, in order to increase the scanning resolution it is necessary to rotate the motor M at slower speed of rotation. The specific relationship between the scanning resolution and the speed of rotation of the motor M will be determined through performing measurements in advance.

For example, as is shown in FIG. 3, in the structure in the present embodiment, the driving voltage is set to +5V so that the speed of rotation of the motor M will be 2 KHz (the encoder pulse frequency, both here and below), in order to read in with a 4800 dpi resolution in the sub-scanning direction.

Here setting the driving voltage to a voltage that is greater than +5V will cause the speed of rotation of the motor M to be faster, resulting in a reduction in the resolution in the sub-scanning direction. For example, as is shown in FIG. 3, using +10V as the driving voltage will cause the speed of rotation of the motor M to be 4 KHz, and the resolution will be 2400 dpi.

On the other hand, in order to increase the resolution in the sub-scanning direction to greater than 4800 dpi, it is necessary to reduce the driving voltage to less than +5V. However, as described above, because the motor M has a dead band from −5V to +5V, the motor M will not rotate when the driving voltage is less than +5V. Consequently, it is not possible to read in the original at a resolution higher than 4800 dpi by simply reducing the driving voltage of the motor M.

While the relationship between the scanning resolution and the speed of rotation of the motor M was explained above, this relationship will be explained below using the amount of rotation of the motor M during the specific charge accumulating interval.

Figure 4:
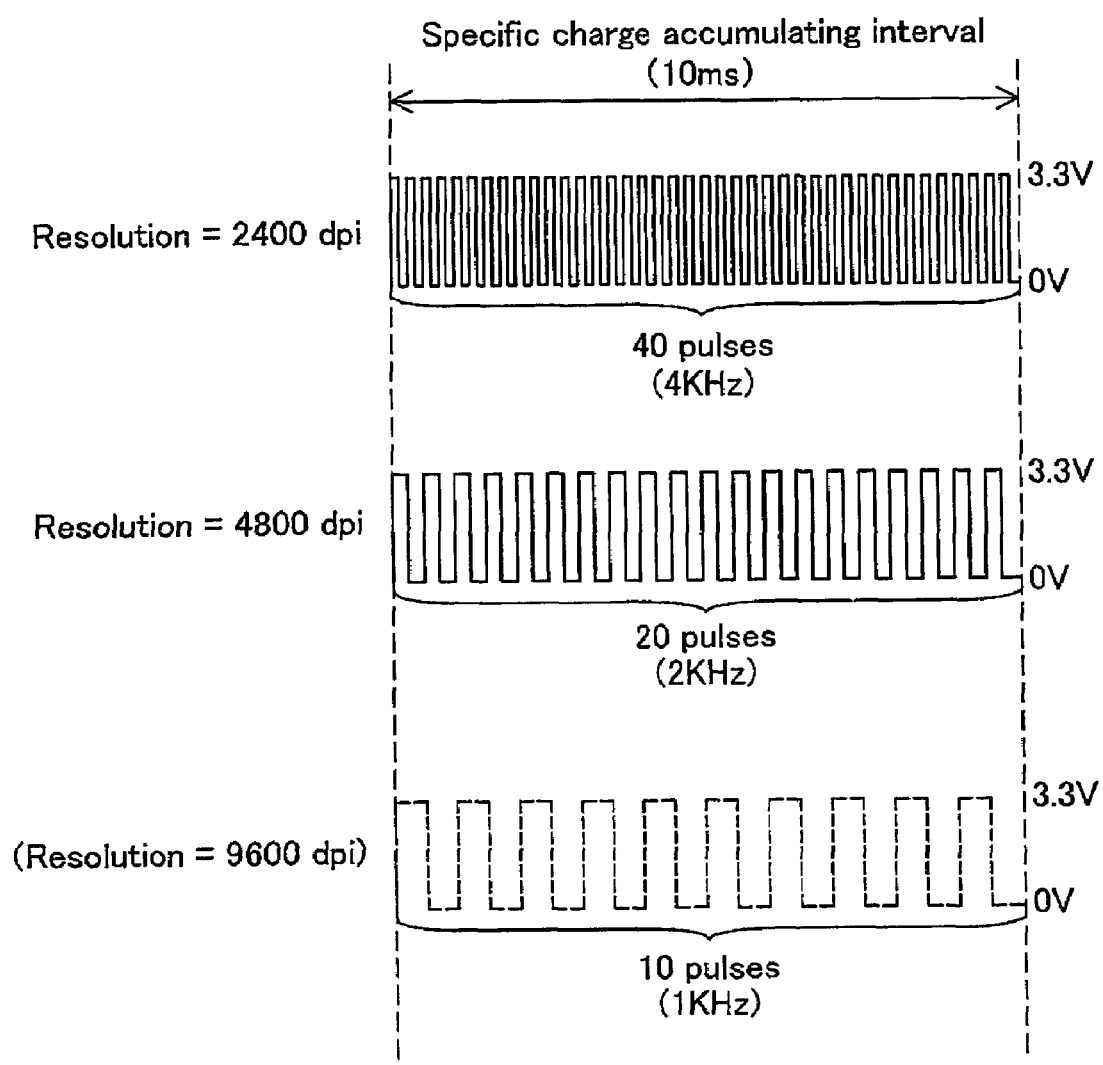
FIG. 4 is an explanatory diagram illustrating the encoder pulses during a specific charge accumulating interval for three scanning resolutions.

FIG. 4 is an explanatory diagram illustrating the encoder pulses outputted from the encoder 100 during the specific charge accumulating interval for each of three scanning resolutions. In FIG. 4, the top part shows the encoder pulses when the resolution is 2400 dpi, and the middle parts shows the encoder pulses when the resolution is 4800 dpi. Note that the specific charge accumulating interval is 10 ms.

As described above, when the resolution is 2400 dpi, the speed of rotation of the motor M is 4 KHz, and, as shown at the top of FIG. 4, the motor M rotates 40 encoder pulses worth during the specific charge accumulating interval (10 ms).

When the resolution is 4800 dpi, the speed of rotation of the motor M is 2 KHz, so, as shown in the middle in FIG. 4, the motor M rotates 20 encoder pulses worth during the specific charge accumulating interval.

When the resolution is 9600 dpi, the motor M does not rotate at a corresponding speed as describe above, so encoder pulses are not outputted. However, as is shown by the dotted line at the bottom of FIG. 4, if it were possible for the motor M to rotate 10 encoder pulses worth during the specific charge accumulating interval, then it would be possible to read out the original at a resolution of 9600 dpi.

Given this, the scanner SC performs the rotation control process, described below, in order to read the original at a resolution that is higher than 4800 dpi, and in order to read the original at a resolution of, for example, 9600 dpi, the motor M is rotated 10 encoder pulses worth during the specific charge accumulating interval. The rotation control process will be described below.

A2. Rotation Control Process

As premises for the rotation control process, the user not only places the original on the contact glass 130 shown in FIG. 1, but also the driver software for the scanner SC is used in the personal computer (not shown) that is connected to the scanner SC to specify the resolution and the original size, and to specify the start of scanning. Note that it will be assumed that the specified resolution in the sub-scanning direction is 9600 dpi.

In the scanner SC, the scanner control unit 111*a* shown in FIG. 2 receives the scan start specification sent from the personal computer. Given this, when the scanner control unit 111*a* receives the scan start instruction, the carriage CR moves to a scan start location according to the specified original size. Note that, for convenience, the explanation of the movement of the carriage CR will be omitted.

When the movement of the carriage CR has been completed, the scanner control unit 111*a* instructs the image sensor control unit 115*a* to start the read-in operation. Moreover, the scanner control unit 111*a* judges whether or not the specified resolution in the sub-scanning direction is a higher level of resolution than 4800 dpi, and if it is determined that the resolution is higher than 4800 dpi, then along with providing notification to the motor control unit 115*c* regarding the specified resolution, an instruction is sent to start the rotation control process.

The operation of the image sensor control unit 115*a* will be explained first. When the image sensor control unit 115*a* receives the instruction to start the read operation, the image sensor driving pulses are outputted to the image sensor IS and the motor control unit 115*c* per each specific charge accumulating interval (10 ms).

The image sensor IS illuminates the original with red, green, and blue light, sequentially, from the light-emitting lamp each time the image sensor driving pulse is received, and the reflected light is received by each of the photosensitive elements of the CCD, which are arranged in the shape of a line. Moreover, the image sensor IS outputs, to the image sensor control unit 115*a* the charge from each of the photosensitive elements as signals for one pixel each, outputting one line worth of signals. On the other hand, the image sensor control unit 115*a* determines the gradation levels for each of the pixels within the line, based on the one line worth of signals outputted sequentially from the image sensor IS, where these gradation values are sequentially stored in the memory 112 as image data.

Figure 5:
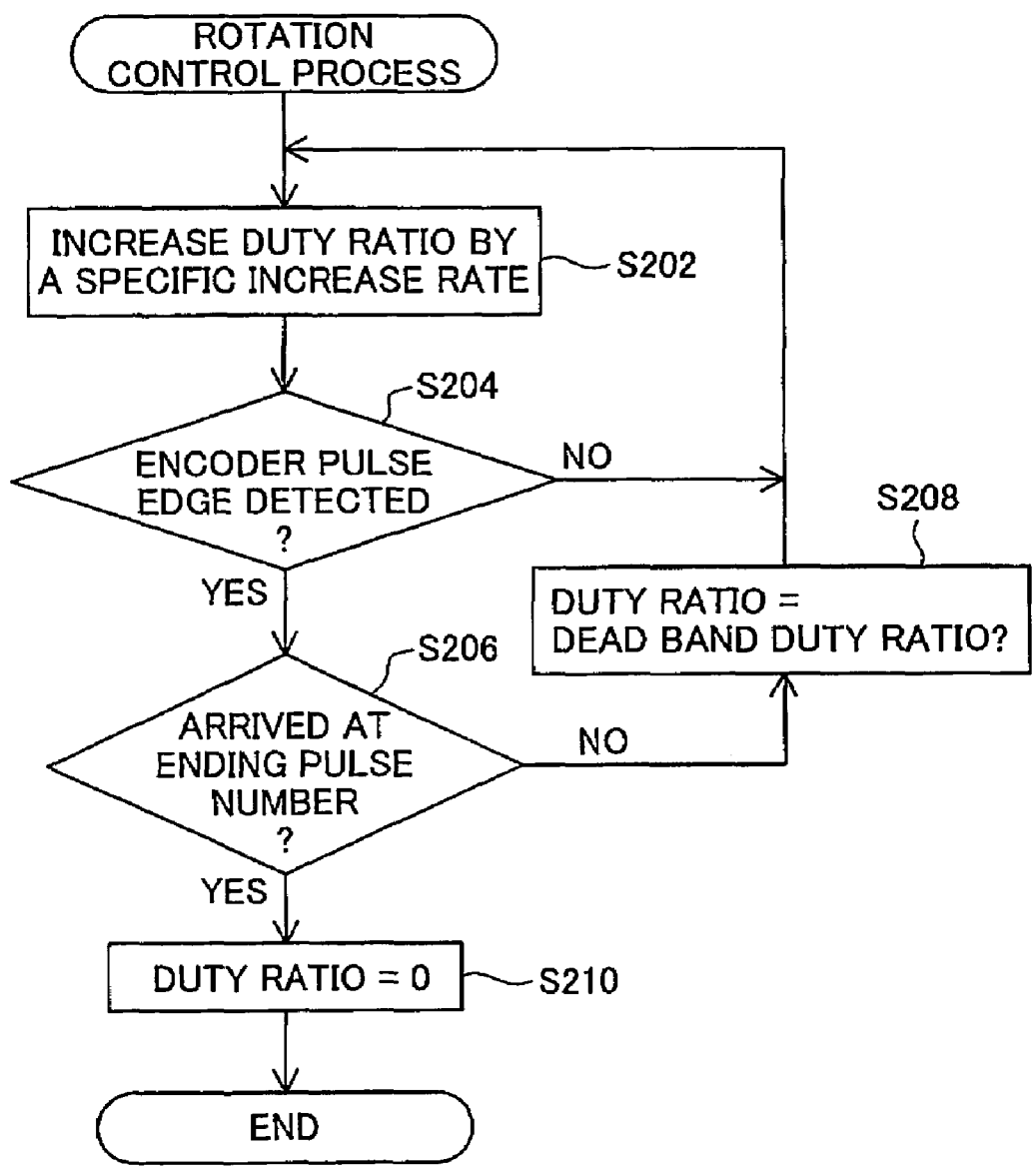
FIG. 5 is a flowchart illustrating the rotation control process in a first embodiment.
Figure 6:
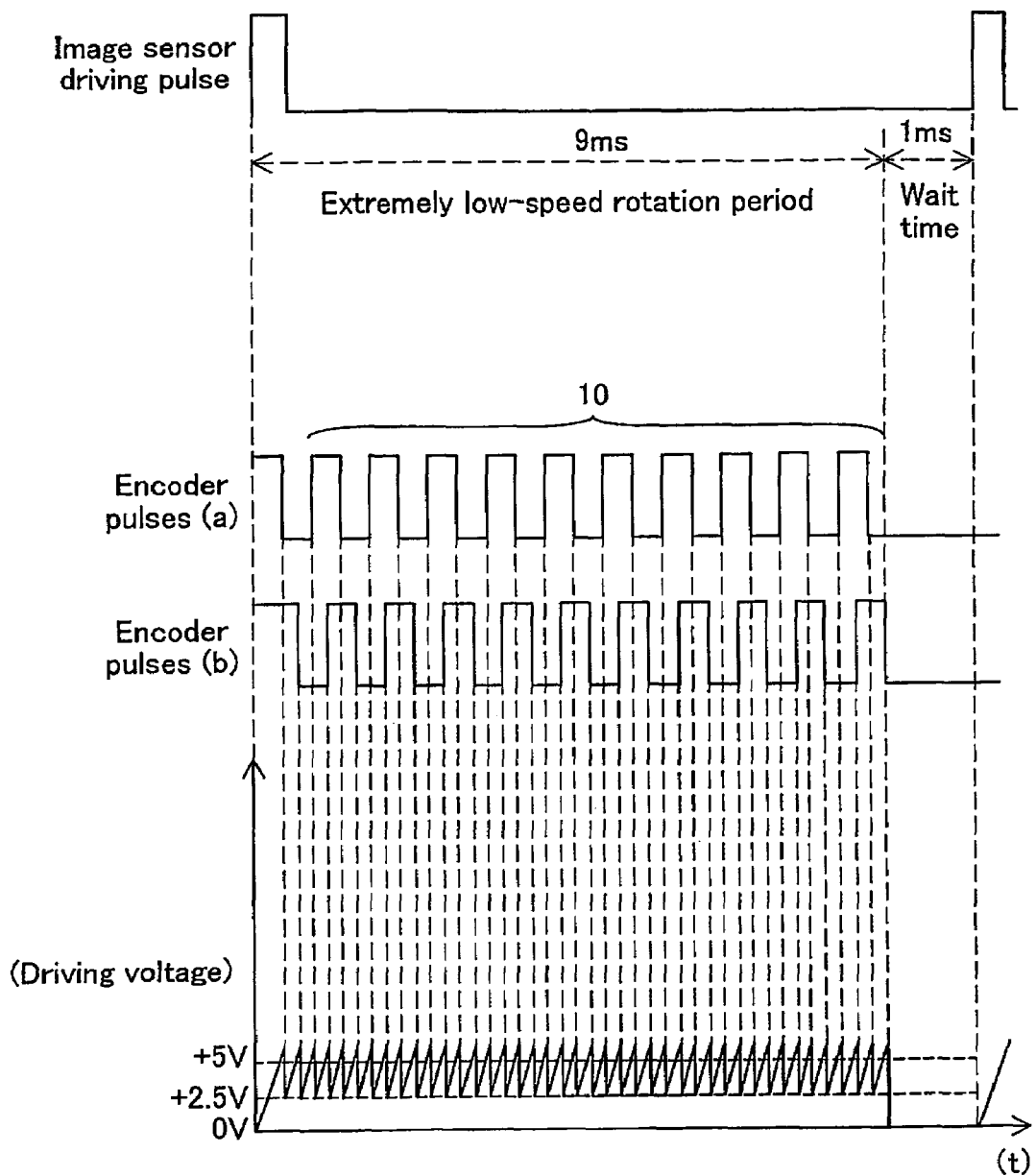
FIG. 6 is a timing chart illustrating the relationship between the image sensor driving pulses, the encoder pulses, and the driving voltages in the extremely low-speed rotation process in the first embodiment.

The process on the motor control unit 115*c* will be explained next. When the motor control unit 115*c* receives, from the scanner control unit 111*a*, the instruction to start the rotation control process, the motor control unit 115*c* awaits the input of the image sensor driving pulse that is outputted from the image sensor control unit 115*a*, and starts the rotation control process. FIG. 5 and FIG. 6 will be used to explain this rotation control process.

FIG. 5 is a flow illustrating the rotation control process during one specific charge accumulating interval in a first embodiment. FIG. 6 is a timing chart illustrating the relationship between the image sensor driving pulse, the encoder pulse, and the driving voltage in the rotation control process during one specific charge accumulating interval in the first embodiment.

In FIG. 6, the top illustrates the image sensor driving pulse inputted by the motor control unit 115*c*, the middle illustrates the encoder pulses that are inputted by the motor control unit 115*c*, and the bottom illustrates the driving pulses that are applied to the motor M by the motor control unit 115*c*. Note that the encoder pulses in the middle include two encoder pulses for A-and B-phases which are shifted from each other by $\pi/2$. Note that FIG. 6 illustrates the image sensor driving pulse, the encoder pulse, and the driving voltage, respectively, when 9600 dpi is specified as the sub-scanning direction read-in resolution.

When the rotation control process shown in FIG. 5 is started at the beginning of each specific charge accumulating interval, the motor control unit 115*a* reads in the duty ratio increase rate from the register. This duty ratio increase rate indicates the proportional increase of the duty ratio of the PWM pulses with the passage of time, where the motor control unit 115*c* increases the duty ratio gradually by the duty ratio increase rate while being timed by a timer, not shown. (Step S202).

After this, the motor control unit 115*c* judges whether or not an encoder pulse edge has been detected (Step S204), and the duty ratio is increased until there is a judgment that a pulse edge has been detected.

When, in this way, the duty ratio increases gradually by the duty ratio increase rate, the driving voltage increases gradually, as shown in FIG. 6. When the driving voltage leaves the range of the dead band (−5V through +5V), the motor M, which had been stopped, begins to rotate. The result is that if the phase A encoder pulse is high at the time that the extremely low-speed rotation process started, then the phase A encoder pulse will change from high to low.

When the phase A encoder pulse changes from high to low, then the motor control unit 115*c* judges that a pulse edge has been detected, and, in this case the ending pulse number is read out from the register, and a decision is made as to whether or not the pulse numbers of each of the phase A and B encoder pulses detected since the beginning of the extremely low-speed rotation process has reached the ending pulse number (Step S206).

Here "10" is stored in the register as the ending pulse number corresponding to the sub-scanning direction resolution of 9600 dpi. If the detected edge is the first edge during the extremely low-speed rotation process, the motor control unit 115*c* determines that the detected pulse number has not reached the ending pulse number of "10."

In this case, the motor control unit 115*c* reads out the dead-band duty ratio from the register, reduces the duty ratio to this dead-band duty ratio (Step S208), and again performs the steps S202 through S208.

A dead-band duty ratio is a duty ratio corresponding to a specific driving voltage within the dead band. In this example, a duty ratio corresponding to the driving voltage of +2.5V is stored in the ratio as the dead-band duty ratio corresponding to the sub-scanning direction resolution of 9600 dpi.

In Step S202 in the second cycle of the procedure, when the duty ratio is increased the driving voltage gradually increases from +2.5V, and when the driving voltage leaves the dead band and exceeds +5V, then again the motor M begins to rotate. At this time, as shown in FIG. 5, this time the phase B encoder pulse goes from high to low.

Consequently, the motor control unit 115*c* detects the edge of this phase B encoder pulse, and because the detected pulse number has not reached the ending pulse number of "10" during the extremely low-speed rotation process, the motor control unit 115*c* performs Step S208 again, and the duty ratio is reduced to the dead-band duty ratio.

In this way, when the processes in steps S202 through S208 are executed repetitively, the motor M rotates and stops repetitively or intermittently, and so the motor control unit 115*c* will detect new encoder pulses (A) and (B). If the pulse number detected is determined to have arrived at the ending pulse number in step S206, then the motor control unit 115c causes the duty ratio to the zero in step S210 to stop the rotation of the motor M.

The result of the extremely low-speed rotation process is that, as shown in FIG. 5, during the interval over which the steps S202 through S208 are repeated (hereinafter termed the "extremely low-speed rotation period") the motor control unit 115c will receive each of the encoder pulses (A) and (B) 10 times.

Here the duty ratio increase rate that is used in steps S202 is determined through measurement in advance and stored in memory as an increase rate such that, in the extremely low-speed rotation process, the time required for rotating the motor M enough to produce 10 encoder pulses will be 9 ms. Consequently, as shown in FIG. 5, after the extremely low-speed rotation period has been completed, a 1 ms wait period is produced before the commencement of the next extremely low-speed rotation process that will input the next image sensor driving pulse. Because the motor M stopped during that wait period, the motor control unit 115c receives a total of 10 encoder pulses for each of A and B phases during 10 ms which is a sum of the extremely low-speed rotation period and the wait period.

The motor control unit 115c performs the rotation control process each time the image sensor driving pulses receive from the image sensor control unit 115a, and thus each 10 ms of the interval for inputting the image sensor driving pulse (the specific charges accumulating interval) the motor M can be rotated by an amount equal to 10 encoder pulses. The result is that the image sensor IS is able to read the original at a resolution of 9600 dpi.

The wait period is provided as an adjustable interval so that the extremely low-speed rotation period will be completed prior to the inputting of the next image sensor driving pulse even if the extremely low-speed rotation period extends beyond the specified length (9 ms) due to variability in the rotation of the motor M and the like Note that the process in step S202 and the process in step S208 correspond, respectively, to the first adjustment and the second adjustment in the claimed invention.

A3. Effects of the First Embodiment

As described above, the motor control unit 115c repetitively performs the action of gradually increasing the duty ratio by the duty ratio increase rate, and then, once the edge of an encoder pulse has been detected, decreases the duty ratio to the dead-band duty ratio. The result is that the driving voltage changes from being within the range of the dead band to being outside of the range of the dead band, and then changes back into the range of the dead band, repetitively, and thus the motor M. repetitively rotates and stops in the vicinity of the dead band.

Consequently it is possible to rotate the motor M at an average speed of rotation that is extremely slow, that is, the rotation produces 10 encoder pulses during the extremely low-speed rotation period (9 ms). Moreover, it is possible to rotate the motor M enough to produce 10 encoder pulses during the specific charge accumulating interval of the 10 ms that is a total of the extremely low-speed rotation period and the wait period, after starting the extremely low-speed rotation period with the input of the image sensor driving pulse. The result is that it is possible to read the original so as to produce a resolution of 9600 dpi in the sub-scanning direction.

Furthermore, the motor control unit 115c is able to overcome the force of static friction by gradually increasing the torque of the motor M by increasing the duty ratio by the duty ratio increase rate, to thereby cause the motor M to rotate. Consequently, in cases wherein the motor M mounted in a scanner SC is replaced with another motor, or when performing the rotation control process in another scanner of the same type as a scanner SC, it will be possible to repetitively rotates and stop the motor in the vicinity of the dead band, even given variability from motor to motor in the width of the dead band.

B. Second Embodiment

In the first embodiment described above, the spacing of the encoder pulses include during the specific charge accumulating interval was constant, as shown in the bottom of FIG. 6. In contrast, in the second embodiment, the spacing of these encoder pulses is not constant. Here the distance traveled by the imaging sensor during the specific charge accumulating interval will be identical in so far as the amount of rotation of the motor during the specific charge accumulating interval is identical, regardless of whether or not the spacing of the encoder pulses is constant. Consequently, the amount of charge accumulating in each of the photosensitive elements during the specific charge accumulating interval will be substantially the same for both of the case wherein the encoder spacing is constant and the case wherein the spacing is not constant, leading to substantially identical read-in results.

Note that in the second embodiment, the overall structure of the scanner, the detailed structure of the control circuit, and the characteristics of the motor M are identical to those in the first embodiment, and this explanation thereof are omitted. However, in the register (not shown), provided in the motor control unit 115c, in addition to the values for the duty ratio increase rate, the ending pulse number, and the dead-band duty ratio, values for an initial duty ratio and an initial pulse number are also stored in advance. Note that the meanings of these values are explained below.

B1. Rotation Control Process

Figure 7:
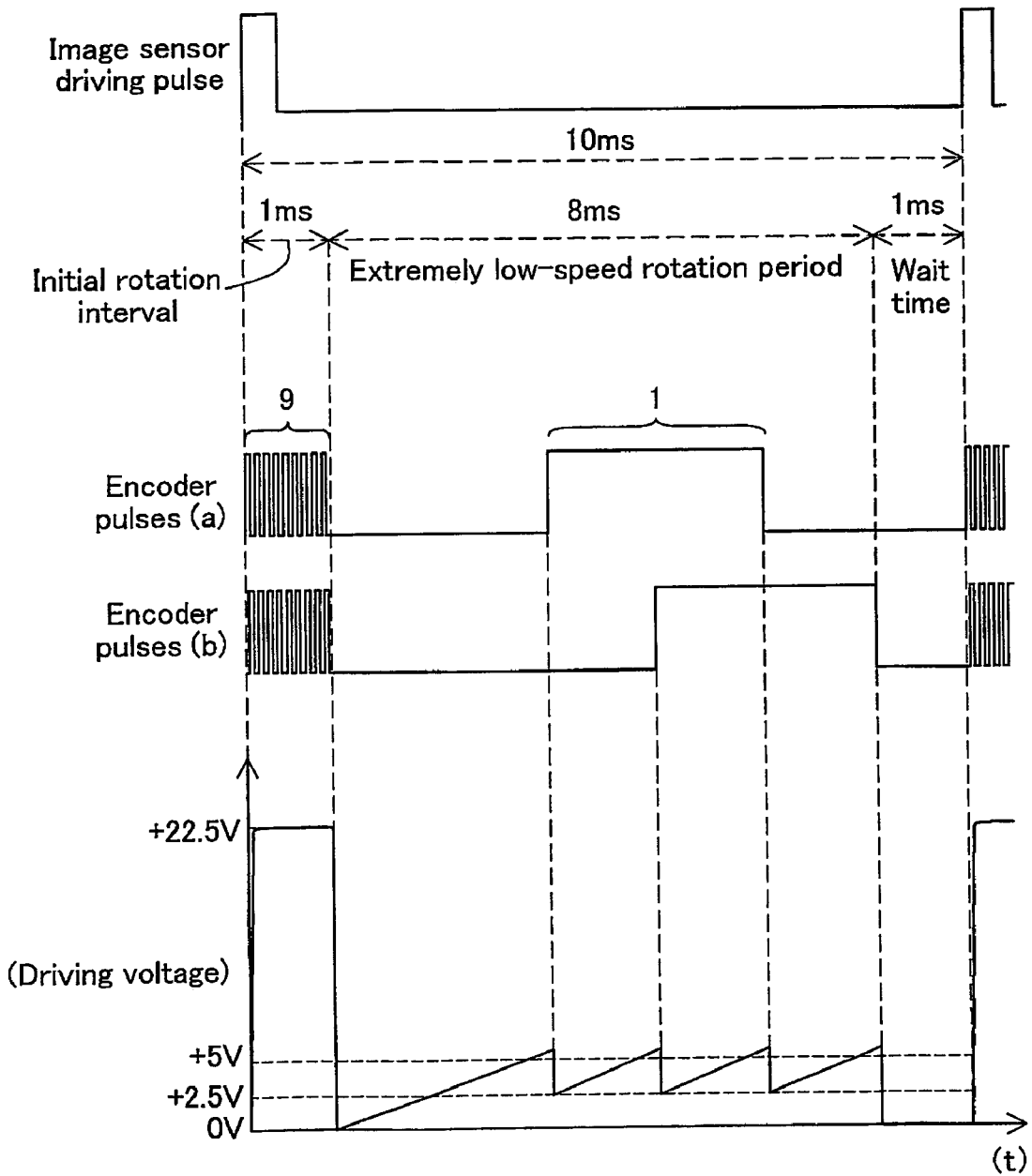
FIG. 7 is a timing chart illustrating the relationship between the image sensor driving pulses, the encoder pulses, and the driving voltages in the extremely low-speed rotation process in a second embodiment.

FIG. 7 shows an overview of the rotation control process in the second embodiment. Note that the process on the image sensor control unit 115a is identical to that in the first embodiment, and thus the explanation thereof will be omitted.

FIG. 7 is a timing chart illustrating the relationship between the image sensor driving pulses, the encoder pulses, and the driving voltages in the rotation control process in the second embodiment. Note that in FIG. 7, the top, middle, and bottom figures correspond to those in FIG. 6, and so explanations thereof are omitted.

When the rotation control process is started, the motor control unit 115c first rotates the motor M by applying a driving voltage (+22.5V) that is sufficiently larger than the range of the dead band, as shown at the bottom of FIG. 7.

After this, the motor control unit 115c temporarily stops the rotation of the motor M, by putting the driving voltage to 0V, after the motor M has been rotated far enough to produce 9 encoder pulses. Following this, the motor control unit 115c gradually increases the driving voltage, as was done in the first embodiment, described above, and when the edge of either the encoder pulse (A) or encoder pulse (B) is detected, the driving voltage is again put to within the range of the dead band (+2.5V), whereby the motor M is rotated far enough to produce one encoder pulse.

In this way, the motor M is rotated far enough to produce 10 encoder pulses within the specific charge accumulating interval of 10 ms so as to read the original at a resolution at a resolution of 9600 dpi.

The details of the rotation control process will be described next. Note that the premises for the rotation control process, as was the case in the first embodiment described above, are that the user places the original onto the contact glass 130 shown in FIG. 1 and that the driver software for the scanner SC is used to set the resolution and the original size in the personal computer (not shown) that is connected to the scanner SC, and to provide an instruction to start the scanning. Note that the resolution specified for the sub-scanning direction will be assumed to be 9600 dpi.

As with the first embodiment, in the scanner SC the scanner control unit 111a receives an instruction send from the personal computer to start the scan. At this time, the carriage CR is moved to the read-in starting position according to the size of the original that has been specified. Note that the process performed by the scanner control unit 111a that has received the instruction to start the scan is the same as in the first embodiment, and thus the explanation thereof is omitted.

After this, when the motor control unit 115c receives, from the scanner control unit 111a, the instruction to start the rotation control process, the motor control unit 115c waits for the input of the image sensor driving pulse, outputted from the image sensor control unit 115a, and then starts the rotation control process, as was the case for the first embodiment.

Figure 8:
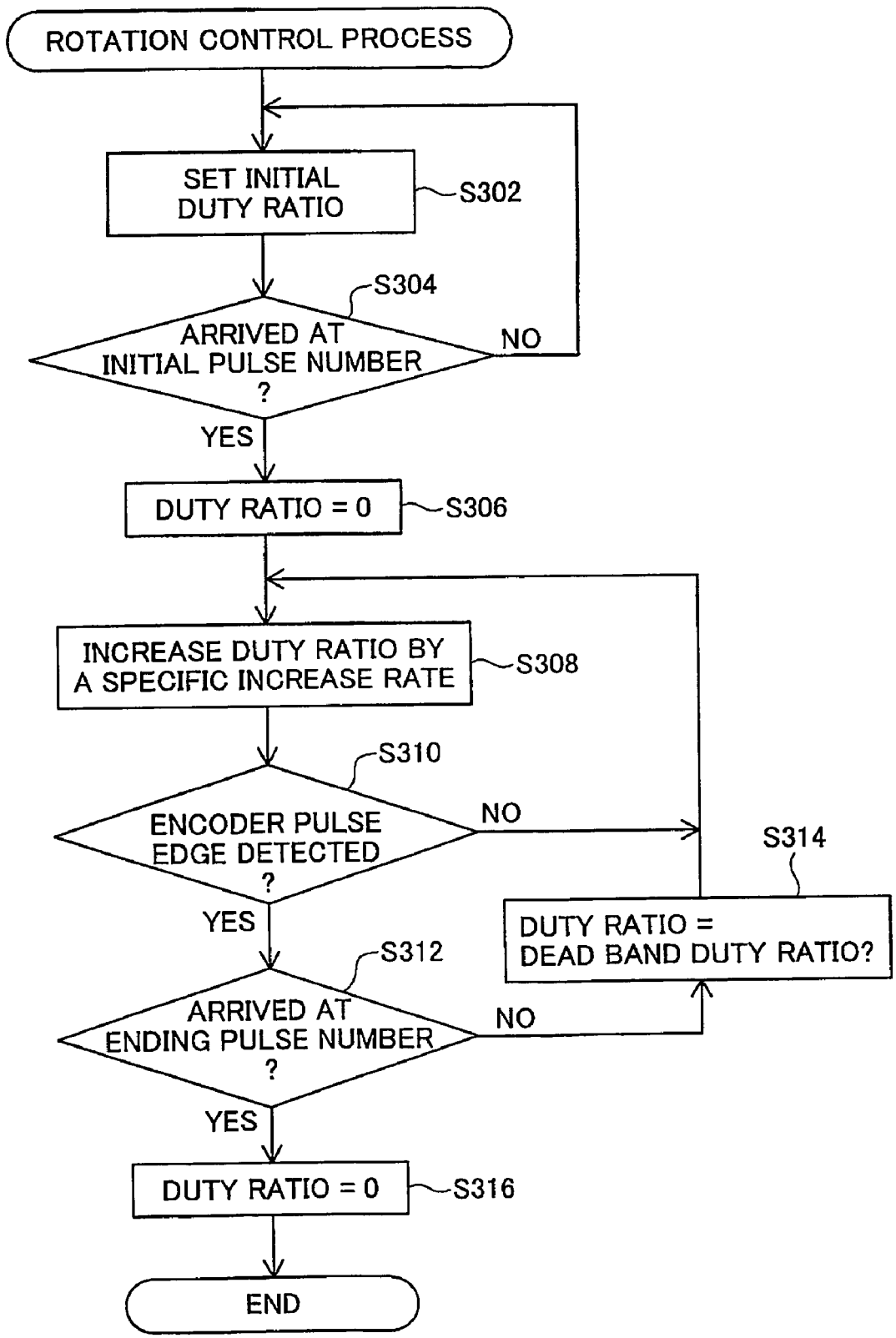
FIG. 8 is a flowchart illustrating the rotation control process in the second embodiment.

FIG. 8 is a flow chart illustrating the rotation control process during one specific charge accumulating interval in the second embodiment. When the rotation control process illustrated in FIG. 8 is started, the motor control unit 115c reads out, from the register provided in the motor control unit 115c, the initial duty ratio corresponding to the sub-scanning direction resolution that has been specified, to control the driving voltage using the initial duty ratio in Step S302.

Here we will assume a duty ratio corresponding to a driving voltage of +22.5V has been stored in the register as the initial duty ratio corresponding to the sub-scanning direction resolution of 9600 dpi. In this case, the driving voltage will go to +22.5V, and, as shown in FIG. 3, the motor M will rotate at a speed of rotation of 9 KHz.

When the driving voltage goes to +22.5V and the motor M begins to rotate, then, as shown in FIG. 7, the motor control unit 115c will receive an encoder pulse from the rotation detection unit 115b. At this time, the motor control unit 115c reads out the initial pulse number from the register, and determines whether or not the number of encoder pulses that have been inputted has reached the initial pulse number in Step S304. Given this, when the motor control unit 115c has determined that the number of received encoder pulses has reached the initial pulse number, the motor control unit 115c puts the duty ratio to 0 to stop the rotation of the motor in Step S306.

Here it is assumed that "9" is stored in the register as the initial pulse number corresponding to the sub-scanning direction resolution of 9600 dpi. In this case, as shown in FIG. 7, the driving voltage is put to 0V when the motor control unit 115c has received 9 encoder pulses for each phase.

Note that the interval wherein the motor M is rotating at 9 KHz (hereinafter termed the "initial rotation interval") will be 9 encoder pulses with, so will be 1 ms long.

Next the processes in steps S308 through S316 will be explained briefly, as these steps, respectively, are the same as the processes in steps S202 through S210 in the rotation control process in the first embodiment.

Next, the motor control unit 115c reads out the duty ratio increase rate from the register, and gradually increases the duty ratio by the duty ratio increase rate while coming with a timer (not shown) in step S308.

The motor control unit 115c determines whether or not an edge of an encoder pulse has been detected (step S310), and increases the duty ratio until it has been determined that an edge has been detected.

The result, as shown in FIG. 7, is that if, at the point that the motor M was stopped by the process in step S306 the encoder pulse (A) was low, then the encoder pulse (A) changes from low to high.

When the encoder pulse (A) changes from low to high, the motor control unit 115c determines that an edge has been detected, and in this case, the ending pulse number is read out from the register and again a decision is made as to whether or not the respective number of pulses of the encoder pulses (A) and (B), detected after the initial rotation interval, have arrived the ending pulse number in step S312.

In the second embodiment, it is assumed that "1" is stored in the register as the ending pulse number corresponding to the sub-scanning direction resolution of 9600 dpi. Given this, when the edge that is detected is the first edge after the initial rotation interval, the motor control unit 115c determines that the number of pulses detected has not arrived at the ending pulse number of "1" for both of phase A and phase B.

In this case, the motor control unit 115c reads out the dead-band duty ratio from the register, and reduces the duty ratio to this dead-band duty ratio in step S314, and then again repeats the processes in steps S308 through S314. Note that it is assumed that a duty ratio corresponding to a driving voltage of +2.5 V is stored in the register as the dead-band duty ratio corresponding to a sub-scanning direction resolution of 9600 dpi, as was the case in the first embodiment.

Given this, the processes of steps S308 through S314 are performed repetitively, and the motor M rotates enough to produce one encoder pulse for both phases while repetitively rotating and stopping, and the motor control unit 115c determines, in the process in step S312, that the ending pulse number has been reached. In this case, the motor control unit 115c stops the rotation of the motor M by making the duty ratio go to zero in step S316.

The result of the rotation control process, described above, is that during the extremely low-speed rotation period (the interval wherein the processes in steps S308 through S314, in the present embodiment are repeated), the motor control unit 115c will receive one encoder pulse for each phase A and B, as shown in FIG. 7. Consequently, the motor control unit 115c will input a total of 10 encoder pulses for each phase during the initial rotation interval and the extremely low-speed rotation period, together.

Here the duty ratio increase rate used in step S308 is determined by measurement in advance, and stored in the register, to be an increase rate such that the interval required for rotating the motor M far enough to produce a single encoder pulse in the extremely low-speed rotation process will be 8 ms. Consequently, as shown in FIG. 7, there will be 1 ms of wait time after the conclusion of the extremely low-speed rotation period. Because the motor M is stopped during this wait period, the motor control unit 115c receives a total of 10 encoder pulses for each phase during 10 ms that is a total of the initial rotation interval, the extremely low-speed rotation period, and the wait period.

The motor control unit 115c performs the rotation control process each time an image sensor driving pulse is inputted from the image sensor control unit 115a, and thus, in each 10 ms image sensor driving pulse input interval (the specific charge accumulating interval) the motor M will rotate far enough to produce 10 encoder pulses, making it possible to read in the original at the resolution of 9600 dpi. Note that the reason why the aforementioned wait period is provided is the same reason as in the first embodiment.

Note that in the present embodiment, the process in the aforementioned step S308 and the process in the aforementioned step S314 correspond, respectively, to the first adjustment and the second adjustment in the claims.

B2. Effects of the Second Embodiment

As described above, the motor control unit 115c repetitively performs the action of gradually increasing the duty ratio by the duty ratio increase rate, and then, once the edge of an encoder pulse has been detected, decreases the duty ratio into the range of the dead-band duty ratio. The result is that the driving voltage changes from being within the range of the dead band to being outside of the range of the dead band, and then changes back into the range of the dead band, repetitively, and thus the motor M. repetitively rotates and stops in the vicinity of the dead band.

Because of this, the motor M can be rotated with an extremely slow average speed of rotation that produces one encoder pulse during the extremely low-speed rotation period of 8 ms, which, when combined with the nine encoder pulses during the initial rotation interval, is enough to produce a total of 10 encoder pulses during the specific charge accumulating interval of 10 ms. The result is that it is possible to read in the original at a sub-scanning direction resolution of 9600 dpi.

As with the first embodiment, the motor control unit 115c is able to overcome the force of static friction by gradually increasing the torque of the motor M by increasing the duty ratio by the duty ratio increase rate, to thereby cause the motor M to rotate. Consequently, in cases wherein the motor M within a scanner SC is replaced with another motor, or when performing the rotation control process in another scanner of the same type as a scanner SC, it will be possible to repetitively rotates and stop the motor in the vicinity of the dead band, even given variability from motor to motor in the width of the dead band.

C. Modified Examples

Note that the present invention is not limited to the examples of embodiment and forms of embodiment described above, but rather maybe embodied in a variety of ways without deviating from the essence thereof, and maybe modified as, for example, described below.

C1. Modified Example 1

While the initial rotation interval in the second embodiment was 1 ms, this interval may be an interval that is either shorter or longer than 1 ms. In making the initial rotation interval shorter than 1 ms, the initial pulse number may be set to a different value of 8 or lower, such as 8 or 7, instead of the "9" and the second embodiment. Moreover, instead of the duty ratio that corresponds to the +22.5 V in the embodiment as the initial duty ratio, a duty ratio corresponding to a larger voltage may be used instead to cause the motor M to rotate far enough to produce 9 encoder pulses in a shorter period of time.

When making the initial rotation interval longer than 1 ms, instead of using the duty ratio corresponding to +22.5 V in the embodiment as the initial duty ratio, a duty ratio corresponding to a lower voltage may be used to cause the motor M to rotate far enough to produce 9 encoder pulses in a longer period of time.

In this way, if the initial rotation interval is shortened, then the extremely low-speed rotation period may be lengthened by that much. Given this, a value that is smaller than the value in the second embodiment may be stored in the register as the duty ratio increase rate, so that the speed at which the driving voltage increases will be slower. Moreover, the dead-band duty ratio may be set to be smaller than the value in the second embodiment to lengthen the time between the motor stopping and the commencement of restarting. Note that when the initial rotation interval is lengthened, the opposite maybe done as for the case, described above, wherein the initial rotation interval was shortened.

C2. Modified Example 2

While in the first embodiment and second embodiment, the dead-band duty ratio was a duty ratio corresponding to a driving voltage of +2.5 V, but the present invention is not limited thereto rather, the duty ratio may be set to any voltage within the range of the dead band. For example, the duty ratio may be a duty ratio corresponding to +1 V, a duty ratio corresponding to +4 V, etc.

Even in these cases, the driving voltage will be within the range of the dead band in the processes in steps S308 and S314, making it possible to halt the rotation of the motor M temporarily. Note that even in cases wherein the dead-band duty ratio has been changed, the duty ratio increase rate may be changed as well so that the extremely low-speed rotation period will be 8 ms or 9 ms, as was the case in the first embodiment and the second embodiment. In other words, a value that will cause the extremely low-speed rotation period to be 8 ms or 9 ms may be determined through measurement in advance, and stored in the register as the duty ratio increase rate, depending on the dead-band duty ratio.

C3. Modified Example 3

While in the first embodiment and the second embodiment, described above, the duty ratio was increased or the duty ratio was decreased to the dead-band duty ratio each time an encoder pulse edge was detected, instead the increase or decrease in duty ratio may be performed each time a specific number of edges, 2 or greater, is detected. In this case, the duty ratio increase rate may be changed accordingly, in, for example, the first embodiment, so that the extremely low-speed rotation period will be 8 ms long. To do this, a value that will cause the extremely low-speed rotation period to be 8 ms can be determined in advance through measurement, and stored in the register as the duty ratio increase rate.

C4. Modified Example 4

While in the first embodiment and the second embodiment, a 1 ms wait period was provided, the entire specific charge accumulating interval may be filled with the extremely low-speed rotation period, without providing a wait period. Alternatively, the specific charge accumulating interval may comprise the initial rotation interval and the extremely low-speed rotation period.

C5. Modified Example 5

While in the first embodiment and the second embodiment, the motor M controlled by the rotation control process was a motor for conveying a carriage CR equipped in a scanner SC, the present invention is not limited thereto. Through performing the extremely low-speed rotation process described above, even in motors provided in other devices it is possible to rotate a motor at an average speed of rotation that is slower than the case wherein the motor is rotated continuously through the application of a driving voltage outside of the dead band.

C6. Modified Example 6

In the first embodiment and the second embodiment, the motor M was a DC motor; however, the motor may be an AC motor instead of the DC motor. In this case, the frequency of the driving voltage (AC) that is applied to the AC motor may be increased gradually to cause the frequency of the AC motor to move out of the range of the dead band to cause the AC motor to rotate, and then the frequency of the driving voltage may be dropped once the edge of the encoder pulse has been detected, to adjust the frequency of the driving voltage so as to enter into the range of the dead band.

C7. Modified Example 7

While in the first embodiment and the second embodiment, the image sensor IS was a CIS-type image sensor, an optical compression-type image sensor may be used instead of the CIS-type image sensor. Because a light source and a motor for moving a carriage, upon which a mirror is mounted, are provided in the optical compression-type scanner as well, the execution of the extremely low-speed rotation process described above makes it possible to rotate the motor at an extremely low speed. The result is that it is possible to move the carriage at an extremely low-speed, and thus possible to obtain an image with a higher level of resolution than the image that can be obtained when the motor is rotated continuously through the application of a driving voltage outside of the range of the dead band.

C8. Modified Example 8

While in the first embodiment and the second embodiment, the motor control unit 115c adjusted the driving voltage using the PWM control method, the Pulse Amplitude Modulation (PAM) control method may be used instead of the PWM control method. Moreover, the adjustments may be made through a control method that combines the PWM control method with the PAM control method.

C9. Modified Example 9

While in the first embodiment and the second embodiment, the encoder was a rotary encoder, other encoders, such as an encoder provided with a Hall element or a resolver, or the like, may be used instead of the rotary encoder.

C10. Modified Example 10

A portion of the structures achieved to hardware in the first embodiment and the second embodiment may instead be replaced with software. For example, the control of the applied voltage (the PWM control), performed by a motor driver control unit (ASIC) may instead be achieved in software.

What is claimed is:

1. A motor control device for controlling rotation of a motor by controlling a driving voltage applied to the motor, comprising:
    a driving voltage control unit configured to control the driving voltage; and
    a detecting unit configured to detect rotation of the motor, the motor having operating characteristics indicative of relationship between the driving voltage and a rotation speed of the motor, the operating characteristics having a specific dead-band range of driving voltages wherein the rotation speed of the motor is zero regardless of changes in the driving voltage,
    wherein the driving voltage control unit performs a low rotation control operation including at least one alternating repetition of a first control operation and a second control operation, the first control operation adjusting the driving voltage to have a value outside of the dead-band range from a value within the dead-band range, the second control operation adjusting the driving voltage to have the value within the dead-band range from the value outside of the dead-band range, wherein the second control operation is performed after a specific first amount of motor rotation has been detected in the first control operation.

2. A motor control device according to claim 1, wherein the low rotation control operation is repetitively performed with a specific interval.

3. A motor control device according to claim 1, wherein the driving voltage control unit changes the driving voltage at a specific rate of change in respect to passage of time in the first control operation, thereby adjusting the driving voltage to have a value outside of the dead-band range from a value within the dead-band range.

4. A motor control device according to claim 3, wherein
    the driving voltage control unit repeats the low rotation control operation with a specific interval in synchronism with reference timing signal pulses indicating the specific interval, and
    the number of alternating repetitions of the first and second control operations within the low rotation control operation is set so that a total amount of rotation of the motor, detected by the detecting unit, during the specific interval will be a specific total amount of rotation.

5. A motor control device according to claim 4, wherein the driving voltage control unit adjusts the driving voltage to maintain within the dead-band range after the low rotation control operation until a next reference timing signal pulse is generated.

6. A motor control device according to claim 3, wherein the specific rate of change is set so that an average speed of rotation of the motor is slower than the lowest speed of rotation of the motor that is attained by adjusting the driving voltage to be outside of the dead-band range.

7. A motor control device according to claim 1, wherein the motor is a DC motor.

8. A device for reading an original, comprising the motor control device according to claim 1.

9. A motor control device according to claim 1, wherein the driving voltage control unit performs, before the low rotation control operation, an initial rotation control operation in which the driving voltage is adjusted to have a value outside of the dead-band range from a value within the dead-band range to thereby cause the motor to rotate, and then adjusted to have the value within the dead-band range from the value outside of the dead-band range after a specific second amount of motor rotation has been detected.

10. A motor control device according to claim 9, wherein the driving voltage control unit changes the driving voltage at a specific rate of change in respect to passage of time in the first control operation, thereby adjusting the driving voltage to have a value outside of the dead-band range from a value within the dead-band range.

11. A motor control device according to claim 10, wherein
    the driving voltage control unit repeats the initial rotation control operation and the low rotation control operation with a specific interval in synchronism with reference timing signal pulses indicating the specific interval, and
    the second amount of rotation and the number of alternating repetitions of the first and second control operations within the low rotation control operation are set so that a total amount of rotation of the motor, detected by the detecting unit, during the specific interval will be a specific total amount of rotation.

12. A motor control device according to claim 11, wherein the driving voltage control unit adjusts the driving voltage to maintain within the dead-band range after the low rotation control operation until a next reference timing signal pulse is generated.

13. A motor control device according to claim 10, wherein the specific rate of change is set so that an average speed of rotation of the motor is slower than the lowest speed of rotation of the motor that is attained by adjusting the driving voltage to be outside of the dead-band range.

14. A motor control device according to claim 9, wherein the first amount of motor rotation is less than the second amount of motor rotation.

15. A motor control device according to claim 14, wherein the first amount of motor rotation is the smallest amount of rotation detectable by the detecting unit.

16. A motor control method for controlling rotation of a motor by controlling a driving voltage applied to the motor, the motor having operating characteristics indicative of relationship between the driving voltage and a rotation speed of the motor, the operating characteristics having a specific dead-band range of driving voltages wherein the rotation speed of the motor is zero regardless of changes in the driving voltage, the method comprising the steps of:

(a) adjusting the driving voltage to have a value outside of the dead-band range from a value within the dead-band range to cause the motor to rotate;

(b) after a specific first amount of motor rotation has been detected in the step (a), adjusting the driving voltage to have the value within the dead-band range from the value outside of the dead-band range; and (c) performing low rotation control operation including at least one alternating repetition of the steps (a) and (b).

17. A motor control method according to claim 16, wherein the low rotation control operation is repetitively performed with a specific interval.

18. A motor control method according to claim 16, further comprising the step of:

performing, before the low rotation control operation, an initial rotation control operation in which the driving voltage is adjusted to have a value outside of the dead-band range from a value within the dead-band range to thereby cause the motor to rotate, and then adjusted to have the value within the dead-band range from the value outside of the dead-band range after a specific second amount of motor rotation has been detected.

* * * * *